(12) United States Patent
Matsumoto et al.

(10) Patent No.: US 7,670,228 B2
(45) Date of Patent: Mar. 2, 2010

(54) COUPLING APPARATUS, MOTOR DEVICE, AND WIPER MOTOR DEVICE

(75) Inventors: Nobuyuki Matsumoto, Hamamatsu (JP); Hideyuki Yagi, Toyohashi (JP); Kazunobu Kanno, Toyohashi (JP); Nobuyuki Imai, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 313 days.

(21) Appl. No.: 11/808,974

(22) Filed: Jun. 14, 2007

(65) Prior Publication Data

US 2007/0293325 A1    Dec. 20, 2007

(30) Foreign Application Priority Data

Jun. 20, 2006    (JP)    ............... 2006-170075

(51) Int. Cl.
    *F16D 3/68*    (2006.01)
(52) U.S. Cl. ........................ 464/73; 74/89.14
(58) Field of Classification Search ............. 464/73–76; 74/47, 48, 89.14
    See application file for complete search history.

(56) References Cited

U.S. PATENT DOCUMENTS

| 1,417,432 | A | * | 5/1922 | Walker ................ 464/73 |
| 4,627,885 | A | * | 12/1986 | Arlt ................ 464/73 X |
| 5,090,261 | A | | 2/1992 | Nakatsukasa |
| 5,564,981 | A | * | 10/1996 | Iwabuchi et al. ............ 464/73 |
| 5,873,786 | A | * | 2/1999 | Hosoya et al. .............. 464/73 |
| 6,342,011 | B1 | * | 1/2002 | Pokrandt et al. ........... 464/73 |
| 7,135,801 | B2 | | 11/2006 | Yagi |

FOREIGN PATENT DOCUMENTS

| GB | 717421 | * 10/1954 | ................ 464/73 |
| JP | 60-081320 | 6/1985 | |
| JP | 63-053944 | 4/1988 | |
| JP | 03-073745 | 3/1991 | |
| JP | 03-073745 | 7/1991 | |
| JP | 2515645 | 7/1991 | |
| JP | 06-008841 | 2/1994 | |
| JP | 2001-301630 | 10/2001 | |
| JP | 2002-364713 | 12/2002 | |
| JP | 2005-098448 | 4/2005 | |
| JP | 2006-094693 | 4/2006 | |

* cited by examiner

*Primary Examiner*—Greg Binda
(74) *Attorney, Agent, or Firm*—Pearl Cohen Zedek Latzer, LLP

(57) ABSTRACT

A coupling apparatus is provided with a first coupling member, a second coupling member and a damper member. The damper member is arranged between the first coupling member and the second coupling member. At least one of the first coupling member and the second coupling member has a tubular circumferential wall surrounding the outer circumference of the damper member. Accordingly, it is easy to control the diameter of an accommodating hole accommodating the coupling apparatus.

8 Claims, 6 Drawing Sheets

COUPLING APPARATUS, MOTOR DEVICE, AND WIPER MOTOR DEVICE

BACKGROUND OF THE INVENTION

The present invention relates to a coupling apparatus transmitting a rotating force of a first rotary shaft to a second rotary shaft. Further, the present invention relates to a motor device provided with the first rotary shaft, the second rotary shaft and the coupling apparatus, and a wiper motor device for driving a wiper.

Japanese Laid-Open Patent Publication No. 2006-94693 discloses a motor device provided with a motor portion, and a speed reducing portion coupled to the motor portion. Japanese Utility Model No. 2515645 discloses a coupling apparatus for coupling a rotary shaft in a motor portion to a worm shaft in a speed reducing portion.

The coupling apparatus is provided with a first coupling member, a second coupling member, and a damper member. The damper member made of a rubber is arranged between the first coupling member coupled to the rotary shaft, and the second coupling member coupled to the worm shaft. The first coupling member has a discoid main body, and three first arms extending toward the second coupling member from the main body. The second coupling member is formed in the same shape as the first coupling member, and has three second arms. The damper member has a ring-shaped core portion, and six buffering teeth protruding radially outward from the core portion. Three first arms and three second arms are alternately arranged in six buffering recesses defined by six buffering teeth. In other words, the first arm and the second arm face each other in a circumferential direction while holding the buffering teeth therebetween.

A gear housing in the speed reducing portion has an accommodating hole (an axial hole) having a circular cross-sectional shape and accommodating the coupling apparatus. A rotation of the first coupling member is transmitted to the second coupling member via the damper member. As a result, the worm shaft is rotated. The damper member absorbs a deflection and an eccentricity between the rotary shaft and the worm shaft.

The first arms and the second arms compress the buffering teeth in the circumferential direction. Accordingly, there is a risk that the buffering teeth having elasticity are deformed, protrudes radially outward than the first arms and are in contact with the inner circumferential surface of the accommodating hole. In other words, there is a risk that the rotation of the first coupling member and the second coupling member is hindered.

The diameter of the accommodating hole may be enlarged in such a manner as to prevent the buffering teeth from being in contact with the inner circumferential surface of the accommodating hole even if the buffering teeth protrude radially outward. However, if the diameter of the accommodating hole is enlarged, there is a risk that a lubricating agent such as grease or the like applied to the worm shaft passes through the accommodating hole so as to make an intrusion into the motor portion. Accordingly, it is difficult to control the diameter of the accommodating hole.

SUMMARY OF THE INVENTION

An objective of the present invention is to provide a coupling apparatus in which it is easy to control the diameter of an accommodating hole accommodating the coupling apparatus. Another objective of the present invention is to provide a motor device provided with the coupling apparatus, and a wiper motor device.

In accordance with one aspect of the present invention, a coupling apparatus is provided. The coupling apparatus is capable of transmitting a rotating force of a first rotary shaft to a second rotary shaft. The second rotary shaft is arranged so as to be coaxial with the first rotary shaft. The coupling apparatus is provided with a first coupling member, a second coupling member, and a damper member. The first coupling member rotates together with the first rotary shaft. The second coupling member rotates together with the second rotary shaft. The damper member is arranged between the first coupling member and the second coupling member in such a manner as to transmit a rotating force of the first coupling member to the second coupling member. The damper member having elasticity defines an outer circumference. At least one of the first coupling member and the second coupling member has a tubular circumferential wall surrounding the outer circumference of the damper member.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF PREFERABLE EMBODIMENT

A description will be given of one embodiment of the present invention with reference to FIGS. 1 to 7B.

Figure 1:
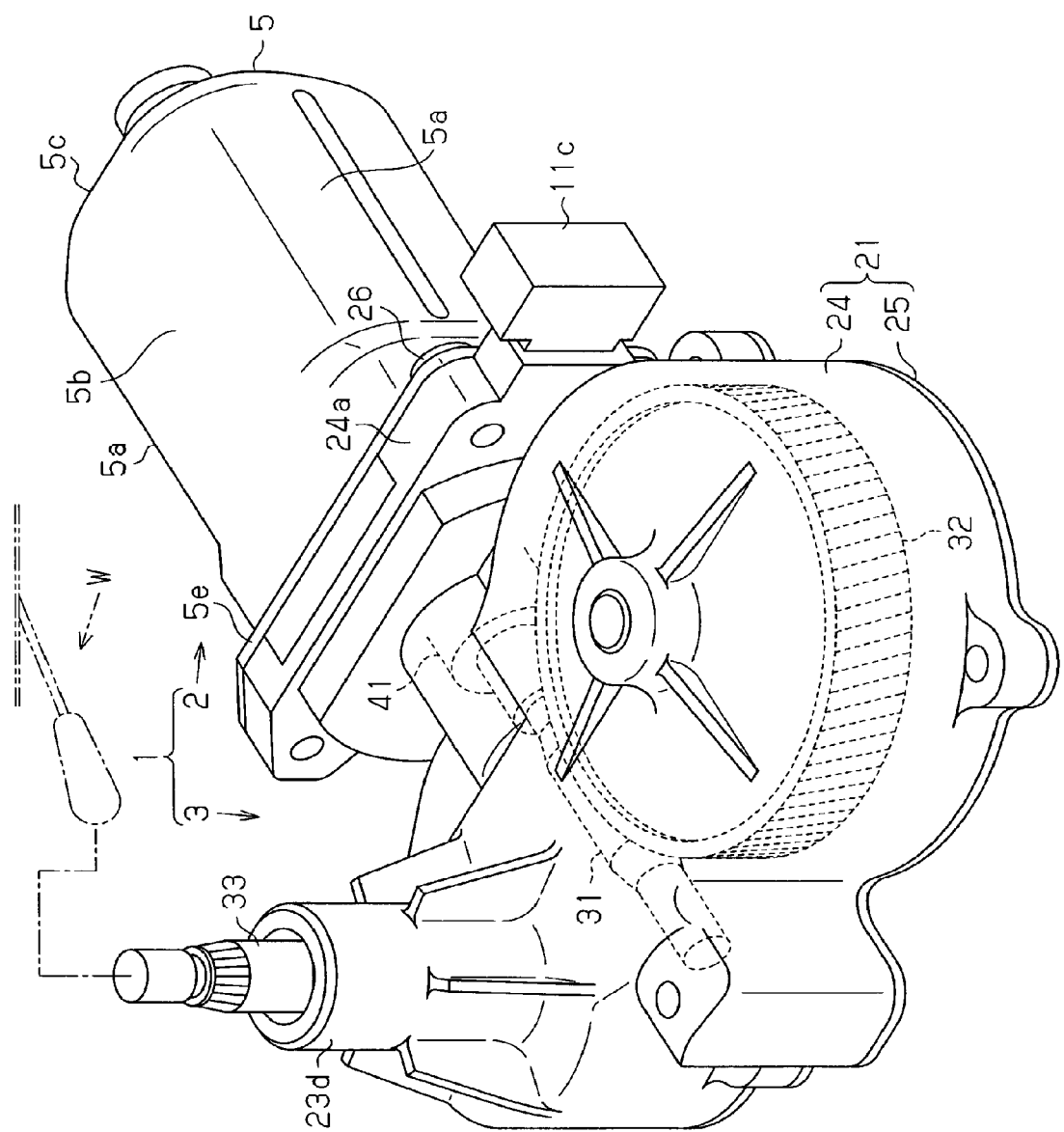
FIG. 1 is a perspective view of a wiper motor device in accordance with one embodiment of the present invention.

FIG. 1 shows a motor device 1 in accordance with the embodiment. The motor device 1 is a wiper motor device driving a rear wiper apparatus mounted to a vehicle. The motor device 1 is provided with a motor portion 2, and a speed reducing portion 3 coupled to the motor portion 2.

The motor portion 2 has a yoke 5 serving as a yoke housing. The yoke 5 is formed in a tubular shape having a bottom portion 5c, and has a yoke opening portion 5d heading for the speed reducing portion 3. A tube of the yoke 5 is formed by a pair of magnet fixing walls 5a having a curved shape, and a pair of coupling walls 5b coupling the magnet fixing walls 5a to each other. A pair of magnet fixing walls 5a face each other.

Figure 2:
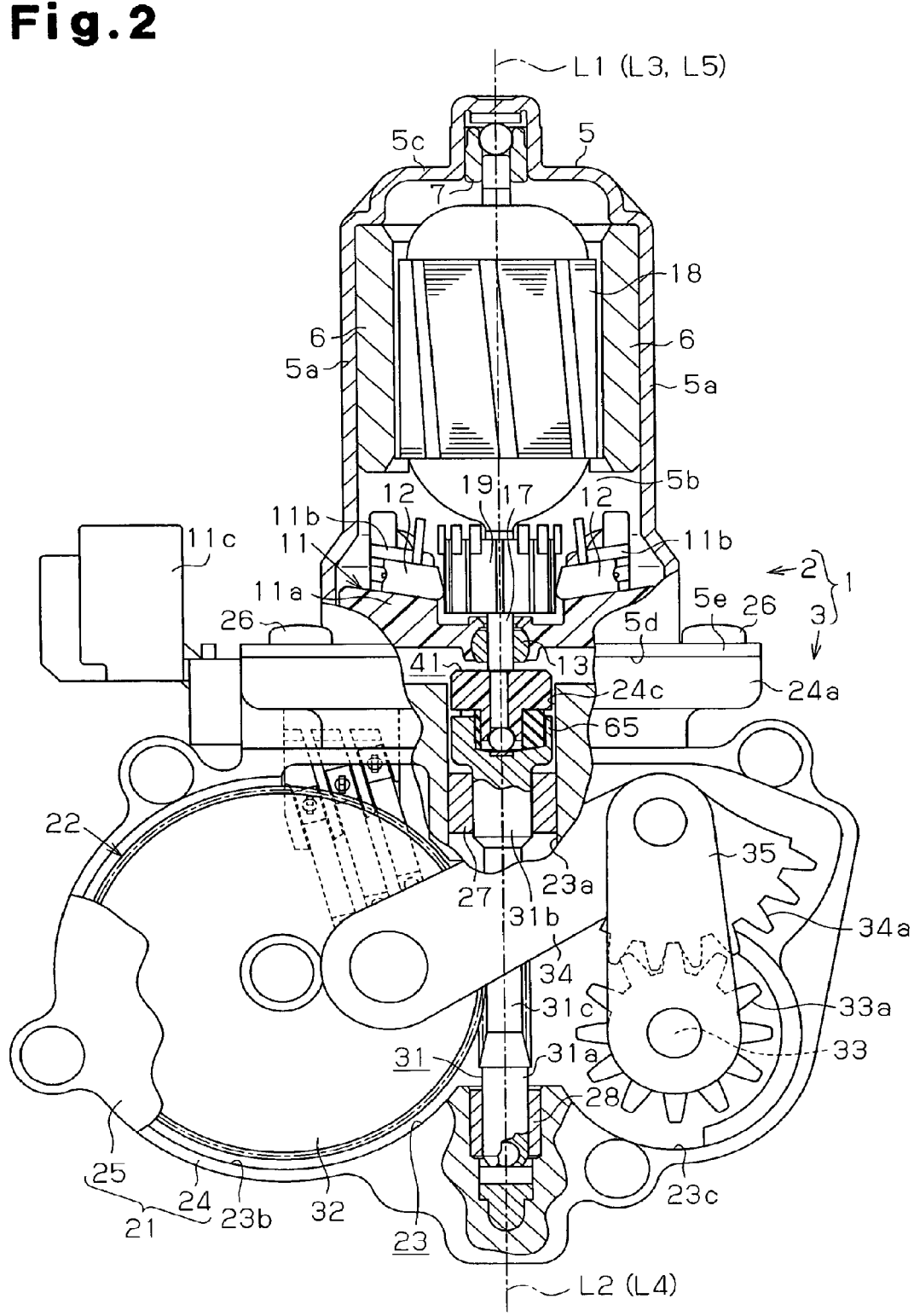
FIG. 2 is a schematic view of the structure of the motor device of FIG. 1.

A pair of coupling walls 5b are a pair of flat plates which are in parallel to each other. A bottom portion 5c of the yoke 5 is substantially formed in an oval shape. As shown in FIG. 2, a magnet 6 is firmly attached to an inner surface of each of the magnet fixing walls 5a. A first bearing 7 is arranged in a center portion of the bottom portion 5c. A yoke opening portion 5d has a flange portion 5e expanded radially outward.

The motor portion 2 has a brush holder 11 closing the yoke opening portion 5d. The brush holder 11 is made of a resin material having an electric insulating property. The brush holder 11 has a holder main body 11a inserted into the yoke opening portion 5d, and a connector portion 11c extending from the holder main body 11a. The holder main body 11a has a pair of brush accommodating portions 11b accommodated in the yoke 5 at an interval of 180 degree respectively in such a manner as to correspond to the magnets 6. Each of the brush accommodating portions 11b substantially formed in the tubular shape accommodates a brush 12, which is substantially shaped like a quadrangular prism shape. A second bearing 13 is arranged in a center portion of the holder main body 11a. The first bearing 7 and the second bearing 13 rotatably support a rotary shaft 17 with respect to the yoke 5.

The connector portion 11c substantially formed as a rectangular tube with a closed-end is open toward the first bearing 7 after protruding along a line passing through two brush accommodating portions 11b from the holder main body 11a. An external connector (not shown) extending from a vehicle can be fitted and attached to the opening portion of the connector portion 11c.

The yoke 5 accommodates an armature 18 between two magnets 6. The armature 18 is provided with the rotary shaft 17 defining a first axis L1, and a commutator 19 attached to the rotary shaft 17. The rotary shaft 17 has a coupling portion 17a protruding to the outside of the yoke 5 while passing through the holder main body 11a. The coupling portion 17a is positioned closer to the speed reducing portion 3 in comparison with the second bearing 13. The coupling portion 17a has a pair of parallel side surfaces, or is shaped to have a width across flats. A brush 12 is brought into slidable contact with the outer circumferential surface of the commutator 19. An external power supply (not shown) supplies an electric current to the armature 18 via an external connector and the brush 12.

The speed reducing portion 3 has a gear group 22, and a gear housing 21 accommodating the gear group 22. The gear housing 21 has a housing main body 24 defining an accommodating recess 23 for accommodating the gear group 22, and a plate-like cover 25 closing an opening portion of the accommodating recess 23. The gear group 22 includes a worm shaft 31, a worm wheel 32, an output shaft 33, and a sector gear 34.

The housing main body 24 is a die cast product made of an aluminum alloy corresponding to a conductive material. As shown in FIG. 1, the housing main body 24 has a fixing portion 24a corresponding to the yoke opening portion 5d and the flange portion 5e. In a state in which the fixing portion 24a is confronted with the flange portion 5e in such a manner that the fixing portion 24a and the flange portion 5e hold the holder main body 11a therebetween, a plurality of screws 26 fasten the housing main body 24 to the yoke 5.

The housing main body 24 has an accommodating hole 24c serving as a shaft hole accommodating the coupling portion 17a. The accommodating hole 24c connects the internal space of the yoke 5 with the accommodating recess 23.

The accommodating recess 23 includes worm accommodating portions 23a connected to each other, a wheel accommodating portion 23b, and a shaft accommodating portion 23c. The worm accommodating portion 23a accommodates a worm shaft 31 defining a second axis L2. The wheel accommodating portion 23b accommodates a worm wheel 32 engaging with the worm shaft 31. The shaft accommodating portion 23c accommodates an output shaft 33 exposed to the outside from the housing main body 24. The wheel accommodating portion 23b and the shaft accommodating portion 23c hold the worm accommodating portion 23a therebetween.

The worm accommodating portion 23a extends along the first axis L1 so as to extend the accommodating hole 24c. In both ends of the worm accommodating portion 23a, there are arranged a third bearing 27 and a fourth bearing 28 rotatably supporting the worm shaft 31. The third bearing 27 is adjacent to the accommodating hole 24c. The worm shaft 31 is coaxially arranged with the rotary shaft 17. In other words, the second axis L2 is arranged so as to be aligned with the first axis L1. The third bearing 27 is positioned at a first end of the worm shaft 31, and the fourth bearing 28 is positioned at a second end of the worm shaft 31.

The wheel accommodating portion 23b is arranged between the worm accommodating portion 23a and the connector portion 11c. A center portion in an axial direction of the worm accommodating portion 23a is connected to the worm accommodating portion 23a, and the worm wheel 32 is engaged with the worm shaft 31 at this connecting position. The axis of rotation of the worm wheel 32 is perpendicular to a coupling wall 5b in the yoke 5. The worm shaft 31 and the worm wheel 32 construct a speed reducing mechanism.

As show in FIG. 1, a tubular output support portion 23d extends perpendicularly to the coupling wall 5b in the yoke 5 from a center portion of the shaft accommodating portion 23c, and is exposed to the out side of the housing main body 24. The output shaft 33 has a driven end in which the first gear 33a is formed, and a drive end protruding to the outside of the gear housing 21. The first gear 33a is positioned within the shaft accommodating portion 23c. The output support portion 23d rotatably supports the output shaft 33. As shown in FIG. 1, a rear wiper W for wiping out a wiped surface (not shown) on a rear glass of a vehicle is fixed to the output shaft 33. FIG. 1 schematically shows the rear wiper W.

As shown in FIG. 2, a sector gear 34 serves as a converting mechanism of converting a rotational motion of the worm wheel 32 into a reciprocating motion of the output shaft 33. In detail, the sector gear 34 formed of a metal plate has a driven end rotatably coupled to the worm wheel 32, and a drive end in which the second gear 34a is formed. The driven end of the sector gear 34 is eccentric from the center of the worm wheel 32. The second gear 34a is engaged with the first gear 33a. An interval maintaining plate 35 formed of a metal plate is positioned between the sector gear 34 and an opening portion of the accommodating recess 23. The interval maintaining plate 35 has a first end rotatably coupled to the second gear 34a, and a second end rotatably coupled to the driven end of the output shaft 33. The first end of the interval maintaining plate 35 is positioned at the center of rotation of the second gear 34a. The interval maintaining plate 35 maintains the distance (an axis interval) between the center axis of the second gear 34a and the center axis of the output shaft 33.

A description will be in detail given below of the coupling apparatus 41. The coupling apparatus 41 can transmit a rotating force of the rotary shaft 17 to the worm shaft 31.

Figure 3:
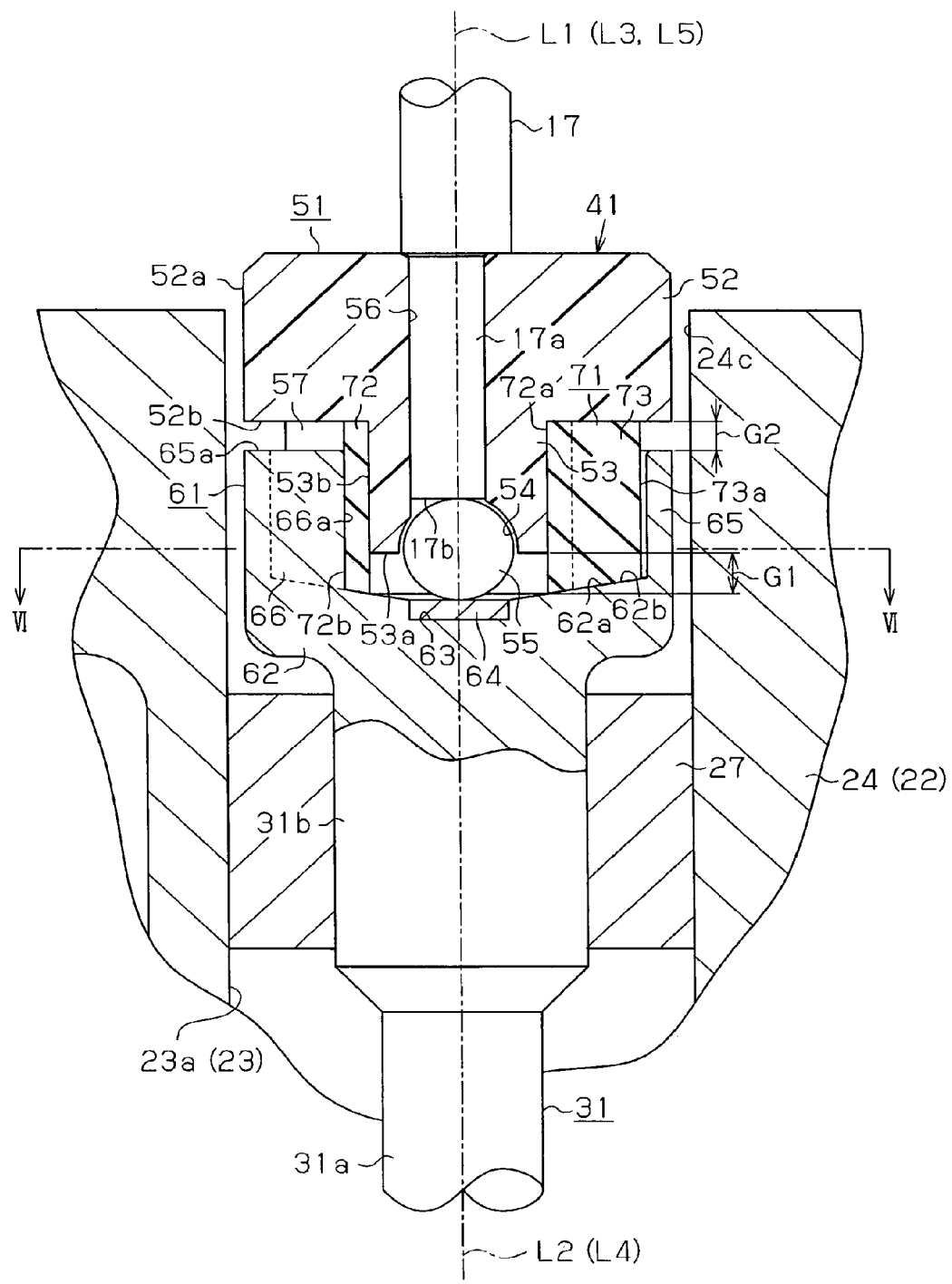
FIG. 3 is a partly enlarged cross-sectional view of the motor device of FIG. 2.
Figure 4:
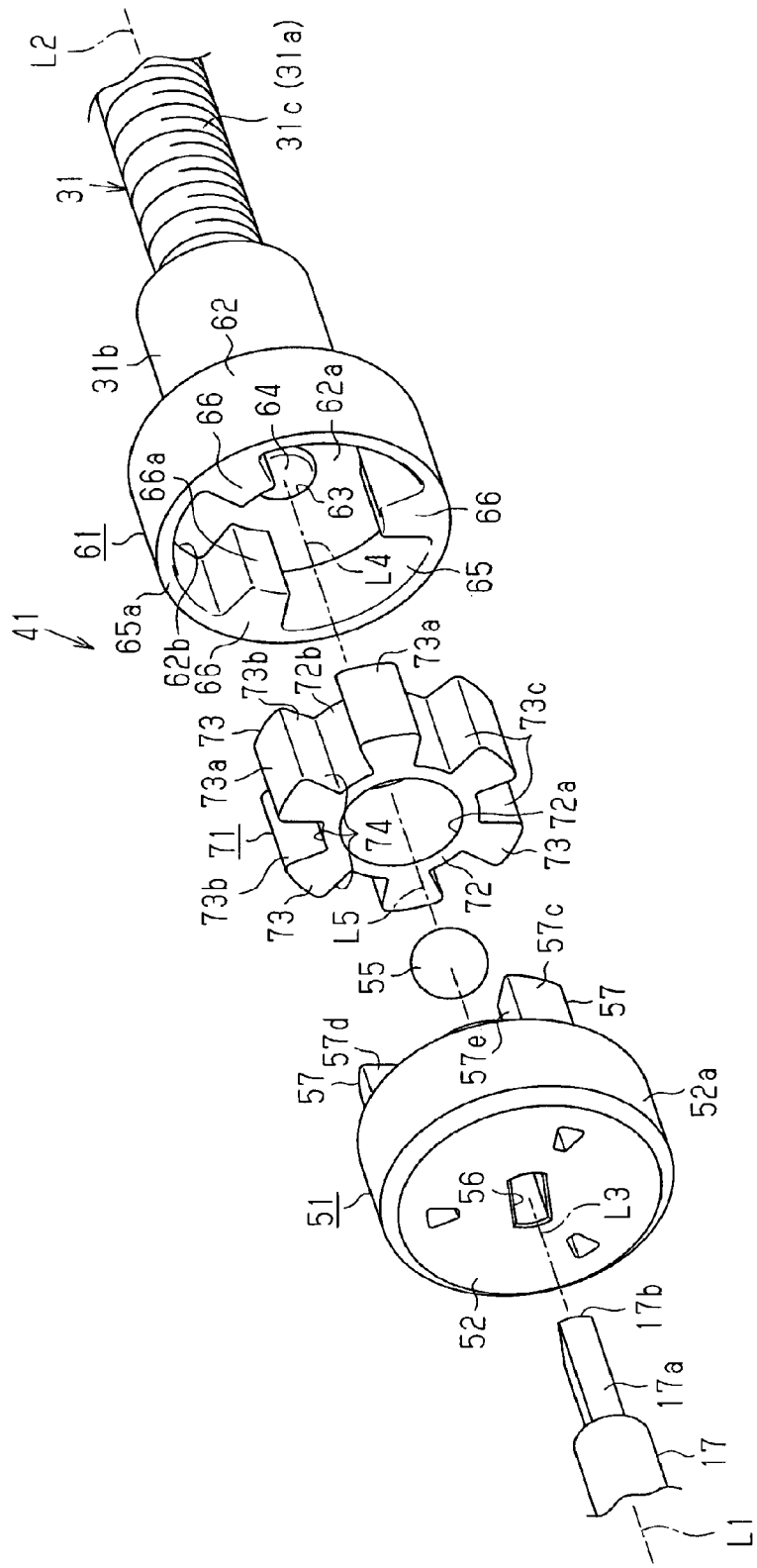
FIG. 4 is an exploded perspective view of a coupling apparatus.

As shown in FIGS. 3 and 4, the coupling apparatus 41 is provided with a first coupling member 51, a second coupling member 61 and a damper member 71. The first coupling member 51 is coupled to the coupling portion 17a in the rotary shaft 17. The second coupling member 61 is integrally formed in a first end of the worm shaft 31. The damper member 71 is arranged between the first coupling member 51 and the second coupling member 61.

Figure 5:
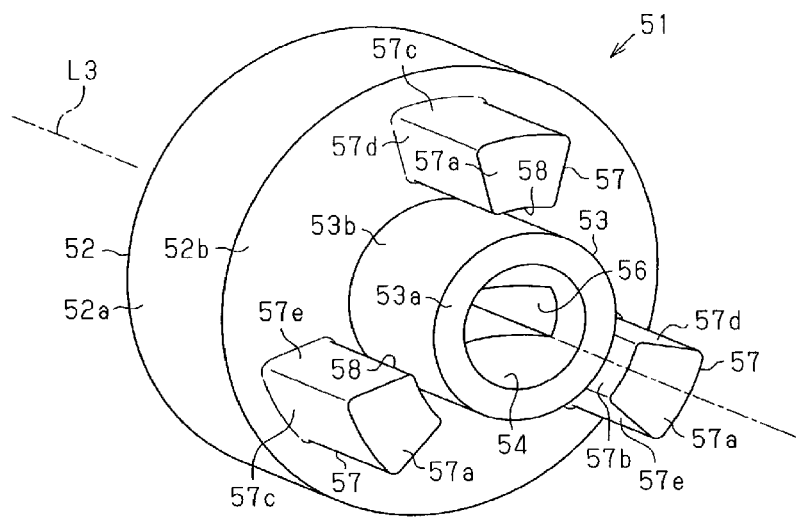
FIG. 5 is a perspective view of a first coupling member shown of FIG. 4.

FIG. 5 shows the first coupling member 51 made of a synthetic resin. The first coupling member 51 has a discoid first main body 52 defining a third axis L3, a boss portion 53 protruding along the third axis L3 from the first main body 52, and three arms 57 protruding along the third axis L3 from the first main body 52 so as to surround the boss portion 53. The cylindrical boss portion 53 is positioned at the center in a radial direction of the first main body 52. Three arms 57 are positioned at a uniform interval in a circumferential direction.

As shown in FIG. 4, a coupling hole 56 in the boss portion 53 is shaped to have a width across flats corresponding to the coupling portion 17a of the rotary shaft 17. As shown in FIG. 3, the first coupling member 51 is integrally rotatably coupled to the rotary shaft 17 on the basis of an insertion of the coupling portion 17a into the coupling hole 56. In other words, a flat surface portion in the inner circumferential surface of the coupling hole 56 can be brought into contact with a flat surface portion in the coupling portion 17a. The third axis L3 is brought into line with the first axis L1.

As shown in FIG. 3, the outer diameter of the first main body 52 is somewhat smaller in comparison with the diameter of the accommodating hole 24c. The boss portion 53 has a spherical body holding portion 54 heading for the worm shaft 31 and formed in a spherical surface shape. The spherical body holding portion 54 accommodates a spherical body 55 made of steel. The curvature of the spherical body holding portion 54 is set to be equal to the curvature of a surface of the spherical body 55.

The coupling hole 56 in the boss portion 53 extends along the third axis L3, and passes through the first main body 52 and the spherical body holding portion 54. A first distal end surface 17b corresponding to a distal end surface of the coupling portion 17a is brought into contact with the spherical body 55.

As shown in FIG. 5, the first main body 52 has a facing surface 52b facing the damper member 71, and the boss portion 53 and an arm 57 are positioned on the facing surface 52b. The cross-sectional shape each of the arms 57 perpendicular to the third axis L3, that is, a shape of the arm 57 as seen from a direction of the third axis L3 is substantially trapezoidal. A dimension in the direction L3 of each of the arms 57 is equal to a dimension in the direction L3 of the boss portion 53. In other words, a distal end surface 57a of each of the arms 57 with respect to the direction of the third axis L3, and a boss end surface 53a corresponding to a distal end surface of the boss portion 53 exist within a common imaginary plane which is perpendicular to the third axis L3.

Each of an arm inner surface 57b corresponding to the inner surface in the radial direction of each of the arms 57, and an arm outer surface 57c corresponding to an outer surface in the radial direction is a curved surface in which the center of curvature exists on the third axis L3. A gap 58 exists between each of the arm inner surfaces 57b and the boss portion 53. Each of the arm outer surfaces 57c is positioned radially inward of the outer circumferential surface 52a of the first main body 52. Each of the arms 57 has a first transmission surface 57d on a clockwise side in FIG. 6, and a second transmission surface 57e on a counterclockwise side. Each of the first transmission surfaces 57d and the second transmission surfaces 57e is a plane extending in the radial direction with respect to the third axis L3.

Figure 7A:
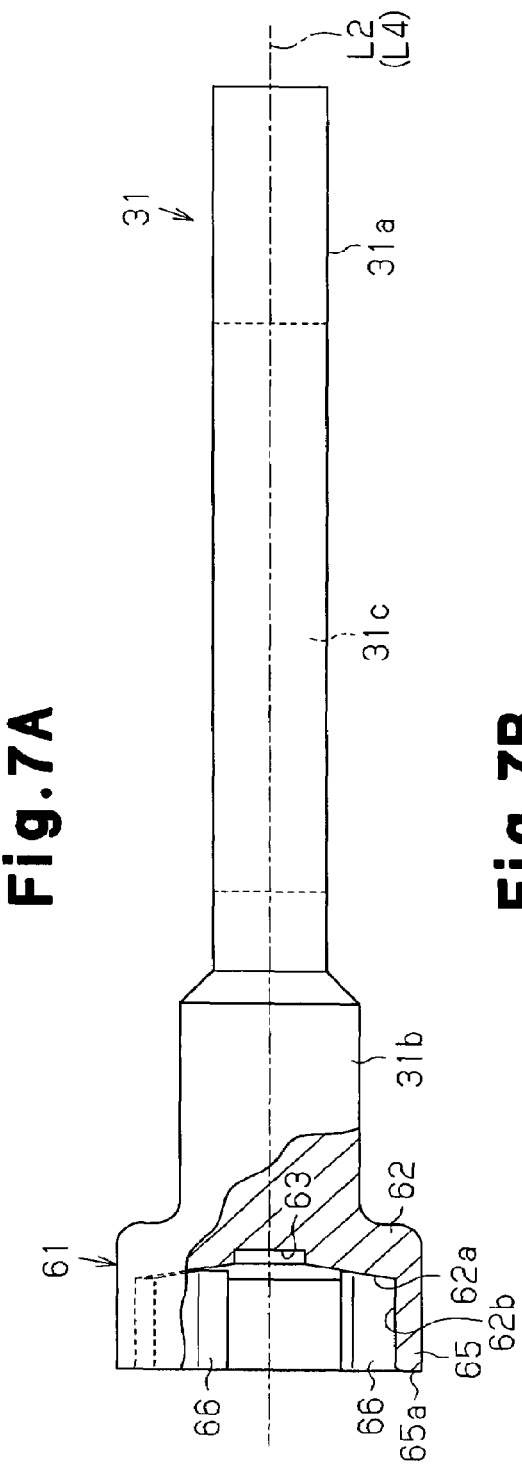
FIG. 7A is a side elevational view or a worm shaft in which a second coupling member is integrally formed.

As shown in FIG. 7A, the second coupling member 61 is integrally formed in the first end of the worm shaft 31. The worm shaft 31 is provided with a worm portion 31a in which a threaded tooth portion 31c is formed, and a supported portion 31b having a larger diameter than the worm portion 31a. In other words, the worm shaft 31 is formed in a stepped shape in which a step exists between the worm portion 31a and the supported portion 31b. The supported portion 31b serving as a pivot portion is positioned between the worm portion 31a and the second coupling member 61. The third bearing 27 rotatably supports the supported portion 31b. The outer diameter of the supported portion 31b is set in correspondence to the inner diameter of the third bearing 27. The worm portion 31a is substantially formed in a columnar shape defining the second axis L2. The threaded tooth portion 31c with which the worm wheel 32 is engaged exists in a center portion of the worm portion 31a with respect to the direction L2. FIG. 7A schematically shows a range in the axial direction of the threaded tooth portion 31c. The supported portion 31b is integrally formed in the worm portion 31a in such a manner that the second axis L2 comes into line with the axis of the supported portion 31b.

The second coupling member 61 is positioned at an end of the supported portion 31b on an opposite side to the worm portion 31a. The second coupling member 61 has a discoid second main body 62 integrally formed in the supported portion 31b, and a cylindrical circumferential wall 65 extending from a peripheral edge and existing over an entire circumference of the second main body 62. In other words, the second coupling member 61 is formed in a cup shape. The second coupling member 61 is formed by forming a recess 62b in a second distal end surface 65a corresponding to a distal end surface of the worm shaft 31 with respect to the direction of the second axis L2. The second distal end surface 65a corresponds to a distal end surface of the circumferential wall 65. In the present embodiment, the second coupling member 61 is a coupling member-with-wall, and the first coupling member 51 is a coupling member-without-wall. The second main body 62 has a larger diameter than the supported portion 31b.

A fourth axis L4 of the second main body 62 is set so as to be aligned with the second axis L2. The recess 62b is open to an opposite side to the supported portion 31b with respect to the fourth axis L4. The second main body 62 has a cup-shaped bottom surface 62a. The bottom surface 62a corresponds to an inclined surface which is gently inclined toward the center in the radial direction. In other words, the bottom surface 62a in the recess 62b is formed in a gentle conical surface shape. The dimension of the second main body 62 in the direction L4 becomes smaller in accordance with heading for the center in the radial direction. The circumferential wall 65 surrounds the bottom surface 62a.

Figure 7B:
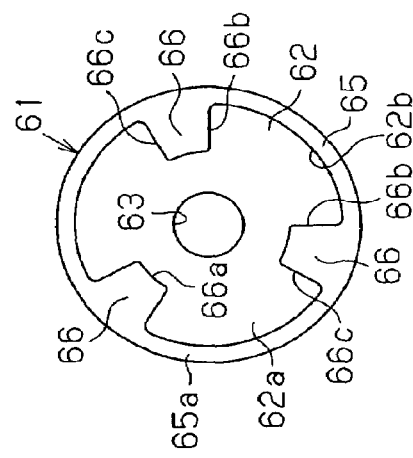
FIG. 7B is a front elevational view of the second coupling member shown in FIG. 7A.

As shown in FIG. 3, the outer diameter of the second main body 62 is set to be equal to the outer diameter of the first main body 52. As shown in FIGS. 7A and 7B, a plate holding recess 63 is formed in a center in the radial direction of the bottom surface 62a. As shown in FIG. 3, the plate holding recess 63 accommodates a discoid thrust plate 64 formed of a steel plate. The thrust plate 64 is brought into contact with the spherical body 55. The shape of the plate holding recess 63 in a cross section perpendicular to the direction L4 is circular.

Figure 6:
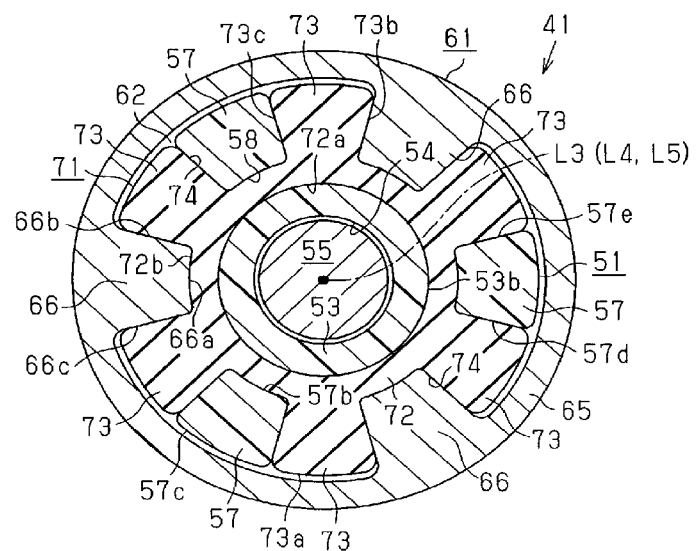
FIG. 6 is a cross-sectional view showing the coupling apparatus of FIG. 3, taken along line VI-VI.

As shown in FIG. 4, the circumferential wall 65 has a circumferential surface which is continuous over an entire circumference. The outer diameter of the circumferential wall 65 is equal to the outer diameter of the second main body 62. As shown in FIG. 6, the inner diameter of the circumferential wall 65 is somewhat larger in comparison with the diameter of a circle passing through three arm outer surfaces 57c. The thickness (the dimension in the radial direction) of the circumferential wall 65 is somewhat smaller in comparison with the distance between the arm outer surface 57c and the outer circumferential surface 52a of the first main body 52.

The second coupling member 61 has three protrusions 66 protruding radially inward from the circumferential wall 65 at a uniform interval in the circumferential direction. Each of the protrusions 66 extends from the second distal end surface 65a to the bottom surface 62a in parallel to the fourth axis L4. As shown in FIG. 6, a shape of each of the protrusions 66 is substantially equal to the arm 57. In other words, the shape of each of the protrusions 66 in a cross section perpendicular to the fourth axis L4 is substantially trapezoidal in the same manner as the arm 57. The radial dimension of each of the protrusions 66 is substantially equal to the dimension of the arm 57 in the radial direction. An inner surface 66a in the radial direction of each of the protrusions 66 is a curved surface in which the center of curvature exists on the fourth axis L4. Each of the protrusions 66 has a first transmitted surface 66b on a clockwise side in FIG. 6, and a second transmitted surface 66c on a counterclockwise direction. Each of the first transmitted surface 66b and the second transmitted surface 66c is a plane lying along the radial direction with respect to the fourth axis L4.

Next, a description will be given of a manufacturing method of the worm shaft 31 and the second coupling member 61. First, a worm raw material (not shown) is formed in a stepped shape by cold forging the worm raw material. In other words, there is formed a shape corresponding to the worm portion 31a and the supported portion 31b shown in FIG. 7A. At the same time of forming the stepped shape, a forging die (not shown) presses an axial center portion in an end surface of a portion of the worm raw material corresponding to the supported portion 31b in the direction L2. In other words, at the same time of forming the stepped shape, the forging die forms a cup shape corresponding to the second coupling member 61. In other words, the forging die forms the circumferential wall 65, the protrusion 66 and the plate holding recess 63. Next, the worm portion 31a is subjected to the component rolling, whereby the threaded tooth portion 31c is formed. As a result, there is completed the worm shaft 31 in which the second coupling member 61 is integrally formed.

The forging die for forming the second coupling member 61 has a distal end corresponding to the bottom surface 62a. In other words, the distal end of the forging die has a gently protruding conical shape. Accordingly, the worm raw material tends to be fluidized in the direction of the axis L4 along the distal end of the forging die, at a time when the forging die forms the recess 62b in the worm raw material.

FIG. 4 shows the damper member 71 so as to have elasticity. The damper member 71 made of a rubber has a damper tube 72 serving as a core portion, and six buffering teeth 73 protruding radially outward from the damper tube 72. Six buffering teeth 73 lined up at a uniform interval in the circumferential direction define six engagement recesses 74 in the circumferential direction. The diameter of a through hole 72a included in the damper tube 72 is equal to the outer diameter of the boss portion 53. In an assembled state of the first coupling member 51, the second coupling member 61 and the damper member 71, the coupling portion 17a passes through the through hole 72a. The thickness of the damper tube 72 (the dimension of the circumferential wall in the radial direction) is equal to a dimension of the gap 58 between the boss portion 53 and the arm inner surface 57b in the radial direction.

Each of the buffering teeth 73 extends over the entire length of the damper tube 72 along a fifth axis L5 corresponding to an axis of the damper tube 72. The fifth axis L5 is set in such a manner as to be aligned with at least one of the third axis L3 and the fifth axis L5. As shown in FIG. 6, a shape of each of the buffering teeth 73 is substantially equal to the arm 57. In other words, a shape of the buffering tooth 73 in the cross section perpendicular to the fifth axis L5 is substantially trapezoidal. An outer surface 73a in the radial direction of each of the buffering teeth 73 is a curved surface in which the center of curvature exists on the fifth axis L5. The dimension of each of the buffering teeth 73 in the radial direction is equal to the dimension of the arm 57 in the radial direction. Each of the buffering teeth 73 has a first buffering surface 73b on a clockwise side shown in FIG. 6, and a second buffering surface 73c on a counterclockwise side. Each of the first buffering surface 73b and the second buffering surface 73c is a plane lying along the radial direction with respect to the fifth axis L5.

At a time of assembling the coupling apparatus 41, the damper member 71 is first assembled in the first coupling member 51 in such a manner that the damper tube 72 accommodates the boss portion 53 as shown in FIGS. 3 and 6. A first end surface of the damper member 71 in the direction of the fifth axis L5 is brought into contact with the facing surface 52b in the first main body 52. Three arms 57 are arranged in three engagement recesses 74 arranged alternately in the circumferential direction among six engagement recesses 74 in the damper member 71. In other words, the buffering teeth 73 are adjacent to both sides of each of the arms 57 in the circumferential direction. Each of the arms 57 is in surface contact with the buffering tooth 73. In other words, each of the first transmission surfaces 57d is brought into contact with the second buffering surface 73c, and each of the second transmission surfaces 57e is brought into contact with the first buffering surface 73b. Each of the arm outer surfaces 57c and an outer surface 73a in the radial direction of each of the buffering teeth 73 are included in a common cylinder surface in which the center of curvature exists on the third axis L3.

In a state in which the spherical body holding portion 54 accommodates the spherical body 55, and the plate holding recess 63 holds the thrust plate 64, the second coupling member 61 is assembled in the first coupling member 51 in such a manner that the damper member 71 is arranged between the first coupling member 51 and the second coupling member 61. A second end surface of the damper member 71 in the direction of the fifth axis L5 is brought into contact with the bottom surface 62a. Three protrusions 66 are arranged in three remaining engagement recesses 74 in which the arm 57 is not arranged, among six engagement recesses 74. In other words, the buffering teeth 73 are adjacent to both sides in the circumferential direction of each of the protrusions 66. The protrusion 66 is in surface contact with the buffering tooth 73. In other words, the second buffering surface 73c is brought into contact with each of the first transmitted surfaces 66b, and the first buffering surface 73b is brought into contact with each of the second transmitted surfaces 66c. The arm 57 and the protrusion 66 which are adjacent to each other face each other in the circumferential direction while holding the buffering tooth 73 therebetween. The inner surface 66a in the radial direction of each of the protrusions 66 is brought into contact with the outer circumferential surface 72b of the damper tube 72. The circumferential wall 65 surrounds the outer circumference of the damper member 71. In other words, the circumferential wall 65 accommodates the damper member 71, the boss portion 53, the spherical body 55 and the protrusion 66.

As shown in FIG. 3, a dimension of the damper member 71 in the direction of the fifth axis L5 is set such that a first gap G1 exists between the boss end surface 53a and the bottom surface 62a, and a second gap G2 exists between the second distal end surface 65a in the circumferential wall 65 and the facing surface 52b. The facing surface 52b faces the second distal end surface 65a with respect to the direction of the axis L5. Each of the first distal end surface 17b in the rotary shaft 17 and the thrust plate 64 is brought into contact with the spherical body 55.

Since the first coupling member 51 is coupled to the coupling portion 17a, and the third bearing 27 rotationally supports the supported portion 31b, the accommodating hole 24c accommodates the coupling apparatus 41. The worm shaft 31 is moved in the direction of the second axis L2 in such a manner as to regulate the engagement state between the threaded tooth portion 31c and the worm wheel 32 optimum.

If a passenger of the vehicle operates a changeover switch (not shown) so as to drive the rear wiper W, an external power supply supplies an electric current to the armature 18 through the brush 12. As a result, if the armature 18 is rotated, the rotary shaft 17 and the first coupling member 51 are rotated, and the rotation of the first coupling member 51 is transmitted to the second coupling member 61 via the damper member 71. In detail, the rotating force of the first coupling member 51 is transmitted to the protrusions 66 from the arm 57 through the buffering teeth 73.

In other words, if the first coupling member 51 is rotated, the arm 57 and the protrusion 66 press the buffering tooth 73 with respect to the circumferential direction. In the case that the first coupling member 51 is rotated in the clockwise direction in FIG. 6, the first transmission surface 57d and the second transmitted surface 66c press the buffering tooth 73. The first main body 52 and the second main body 62 suppress a deformation of the buffering tooth 73 in the axial direction. In the case that a comparatively great load is applied to the worm shaft 31, the buffering tooth 73 acts to deform so as to extend radially outward. However, the circumferential wall 65 suppresses the radially outward deformation of the buffering tooth 73.

The rotation transmitted to the worm shaft 31 by the coupling apparatus 41 is decelerated by the worm wheel 32, and is converted into the reciprocating motion of the output shaft 33 by a sector gear 34. As a result, the rear wiper W is reciprocated so as to wipe out the wiped surface.

The present embodiment has the following advantages.

(1) The second coupling member 61 has the circumferential wall 65 surrounding the outer circumference of the damper member 71. In other words, the circumferential wall 65 accommodates the damper member 71 in the inner side in the radial direction. If the comparatively great load is applied to the worm shaft 31 at a time when the rotating force of the first coupling member 51 is transmitted to the second coupling member 61, the first coupling member 51 and the second coupling member 61 compress the damper member 71. Accordingly, the damper member 71 acts to deform so as to extend radially outward. However, the circumferential wall 65 limits the radially outward deformation of the damper member 71. In other words, the circumferential wall 65 prevents the damper member 71 from being brought into contact with the inner circumferential surface of the accommodating hole 24c. Accordingly, the coupling apparatus 41 transmits the rotating force to the worm shaft 31 from the rotary shaft 17 without being prevented. In other words, a defect of rotation of the coupling apparatus 41 can be prevented. As a result, the rear wiper W smoothly reciprocates. Further, since it is unnecessary to take into consideration the radially outward deformation of the damper member 71, it is easy to control the diameter of the accommodating hole 24c.

(2) The second coupling member 61 having the circumferential wall 65 is integrally formed in the worm shaft 31. Accordingly, it is possible to suppress an increase of the number of parts in the motor device 1, and it is also possible to suppress an increase of an assembling man hour. For example, in comparison with the case of coupling the second coupling member and the worm shaft which are independently manufactured to each other, the present embodiment can improve a coupling strength of the second coupling member 61 to the worm shaft 31. Further, the second coupling member 61 is hard to rattle with respect to the worm shaft 31.

(3) Generally, the worm shaft 31 exposed to the great load acts to oscillate in the direction in which the engagement with the worm wheel 32 is disengaged. In the worm shaft 31 in accordance with the present embodiment, the supported portion 31b supported by the third bearing 27 is positioned between the worm portion 31a and the second coupling member 61. Accordingly, the third bearing 27 easily suppresses the oscillation of the worm shaft 31. As a result, it is easy to suppress axial displacement of the worm shaft 31 with respect to the rotary shaft 17.

(4) The arm 57 and the protrusion 66 which face each other in the circumferential direction while holding the buffering tooth 73 therebetween transmit the rotating force of the first coupling member 51 to the second coupling member 61. The protrusion 66 protrudes radially inward from the circumferential wall 65. The arm 57 faces the protrusion 66 in the circumferential direction. In other words, the arm 57, the protrusion 66 and the damper member 71 exist radially inward of the circumferential wall 65. Accordingly, the circumferential wall 65 prevents the lubricating agent such as the grease or the like applied to the worm portion 31a from being attached to the damper member 71. In other words, the circumferential wall 65 can prevent a gas from being generated from the damper member 71, and can prevent the damper member 71 from being deteriorated. Further, the circumferential wall 65 limits radially outward deformation of the buffering tooth 73 when pressed by the arm 57 and the protrusion 66.

(5) The spherical body 55 is arranged between the first distal end surface 17b in the rotary shaft 17, and the thrust plate 64 in the second coupling member 61. Accordingly, the thrust force of the rotary shaft 17 is transmitted to the worm shaft 31 through the spherical body 55, and the thrust force of the worm shaft 31 is conversely transmitted to the rotary shaft 17 through the spherical body 55. Accordingly, the thrust forces of the rotary shaft 17 and the worm shaft 31 are hard to be applied to the first coupling member 51 and the damper member 71. In other words, it is possible to suppress a reduction of the durability of the first coupling member 51 and the damper member 71 which are other constituting elements of the coupling apparatus 41 than the rotary shaft 17 and the worm shaft 31. Further, since a regulating thrust force generated at a time of regulating the thrust of the rotary shaft 17 and the worm shaft 31 is mutually transmitted to the rotary shaft 17 and the worm shaft 31 through the spherical body 55, it is easy to precisely execute the thrust regulation.

(6) The coupling hole 56 in the first coupling member 51 is open in the spherical body holding portion 54. In other words, the coupling hole 56 is connected to the spherical body holding portion 54. Accordingly, it is possible to easily bring the first distal end surface 17b into contact with the spherical body 55 only by inserting the first distal end surface 17b in the rotary shaft 17 to the coupling hole 56. The spherical body holding portion 54 is arranged within the damper tube 72. The damper tube 72 allows the spherical body 55 to bring into contact with the thrust plate 64 in the second coupling member 61. Accordingly, it is possible to assemble the coupling apparatus 41 only by sequentially assembling the rotary shaft 17, the first coupling member 51, the damper member 71, the spherical body 55 and the worm shaft 31 along the direction of the first axis L1. Therefore, it is possible to improve an assembling workability and a productivity of the coupling apparatus 41.

(7) The first gap G1 in the direction of the second axis L2 is defined between the boss end surface 53a in the first coupling member 51 and the bottom surface 62a in the second coupling member 61. The second gap G2 in the direction of the second axis L2 is defined between the first main body 52 in the first coupling member 51 and the circumferential wall 65 in the second coupling member 61. Accordingly, even in the case that a relative axial runout is generated between the rotary shaft 17 and the worm shaft 31, the axial runout can be absorbed by an elastic deformation of the damper member 71. In other words, it is possible to prevent the first coupling member 51 from being in direct contact with the second coupling member 61. A restoring force of the damper member 71 reduces the shaft deflection between the rotary shaft 17 and the worm shaft 31. As a result, it is possible to reduce the oscillation generation in the motor device 1.

(8) The worm shaft 31 in which the second coupling member 61 is integrally formed can be formed by cold forging the worm raw material (not shown). The forging die has the distal end corresponding to the bottom surface 62a of the second coupling member 61. In other words, the distal end of the forging die for manufacturing the cup-shaped second coupling member 61 has the gently protruding conical shape. Accordingly, at a time when the forging die forms the recess 62b in the worm raw material, the worm raw material tends to fluidize in the direction of the axis L4 along the distal end of the forging die. Accordingly, for example, in comparison with the case that the distal end surface of the forging die is the flat surface which is perpendicular to the fourth axis L4, the productively of the second coupling member 61 is good. In other words, it is possible to improve a yield ratio of the worm shaft 31 in which the second coupling member 61 is integrally formed. Further, if the second coupling member 61 is integrally formed with the worm shaft 31, it is easy to bring the second axis L2 of the worm shaft 31 into line with the fourth axis L4 of the second coupling member 61.

(9) The spherical body 55 is not brought into direct contact with the bottom surface 62a in the second coupling member 61, but is brought into contact with the thrust plate 64. Accordingly, it is easy to prevent an abrasion of the second coupling member 61, and it is easy to elongate the service life of the coupling apparatus 41.

The embodiment mentioned above may be modified as follows.

The thrust plate 64 in the second coupling member 61 may be deleted.

The damper member 71 is not limited to be made of the rubber, but may be made of elastic materials other than the rubber, and may be made of a resin.

The shape of the circumferential wall 65 is not limited to the cylindrical shape as long as it is a tubular shape so as to surround the outer circumference of the damper member 71. The circumferential wall 65 may be formed in a rectangular tube. The circumferential wall 65 is not necessarily formed in a complete tubular shape as long as it can suppress the radially outward deformation of the damper member 71, and may partly have a slit. However, it is preferable that the circumferential wall 65 has a continuous circumferential surface.

The number of the arms 57 in the first coupling member 51 is not limited to three, but may be one or more. The number of the protrusions 66 in the second coupling member 61 is not limited to three, but may be one or more. The number of the buffering tooth 73 in the damper member 71 is not limited to three, but may be one or more. In this case, the numbers of the arm 57, the protrusion 66 and the buffering tooth 73 are set in such a manner that the buffering tooth 73 is arranged between the arm 57 and the protrusion 66 which are adjacent to each other in the circumferential direction, in the assembled state of the first coupling member 51, the second coupling member 61 and the damper member 71.

In the embodiment mentioned above, the coupling portion 17a is formed to have a width across flats, and the coupling hole 56 is formed to have a width across flats corresponding to the coupling portion 17a. The structure is not limited to this, but each of the shape of the coupling portion 17a and the shape of the coupling hole 56 may be formed in a D-shaped form in the cross section perpendicular to the direction of the first axis L1.

The method of forming the worm shaft 31 is not limited to the cold forging process of the worm raw material, but may be a method of cutting the worm raw material.

The second coupling member 61 is not limited to be integrally formed in the worm shaft 31, but may be independently formed from the worm shaft 31. For example, the structure may be made such that such a hole as the coupling hole 56 is provided in the second coupling member 61, a similar coupling portion to the coupling portion 17a is provide in the worm shaft 31, and the coupling portion is inserted to the hole.

The structure is not limited to the second coupling member 61 having the circumferential wall 65, but may be made such that the first coupling member 51 has the circumferential wall 65. Further, both of the first coupling member 51 and the second coupling member 61 have the circumferential wall 65.

The coupling apparatus 41 may be provided in motor devices other than the wiper motor device 1. Further, the coupling apparatus 41 may be provided in apparatuses other than the motor device as long as the apparatus has a structure for coupling two rotary shafts.

What is claimed is:

1. A coupling apparatus for transmitting a rotating force of a first rotary shaft to a second rotary shaft, the second rotary shaft being arranged so as to be coaxial with the first rotary shaft, the coupling apparatus comprising:

a first coupling member having a first end surface and a coupling hole, the first coupling member rotating together with the first rotary shaft inserting through the coupling hole;

a second coupling member formed integrally with the second rotary shaft for rotating together with the second rotary shaft, the second coupling member having a second end surface, a cylindrical circumferential wall and a bottom surface, the second end surface having a recess so as to intergally form the circumferential wall in the second rotary shaft, the bottom surface being surrounded by the circumferential wall and inclined toward a center of the second rotary shaft in the radial direction;

a damper member arranged between the first coupling member and the second coupling member in such a manner as to transmit a rotating force of the first coupling member to the second coupling member, wherein the damper member has an elasticity and defines an outer circumference, the damper member having a through hole through which the first rotary shaft is passed, the circumferential wall surrounding the outer circumference of the damper member so that the circumferential wall limits the radially outward deformation of the damper member; and a spherical body arranged between the first end surface and the bottom surface, wherein a thrust force is transmitted to the second rotary shaft from the first rotary shaft or vice versa through the spherical body.

2. The coupling apparatus according to claim 1, wherein the second rotary shaft has a worm portion capable of engaging with a worm wheel, and a supported portion supported by a bearing, and the supported portion is positioned between the second coupling member and the worm portion.

3. The coupling apparatus according to claim 1, wherein the damper member has a buffering portion protruding in a radial direction,
   wherein the second coupling member is a coupling member-with-wall having the circumferential wall, and the first coupling member is a coupling member-without-wall,
   wherein the second coupling member has a protrusion protruding radially inward from the circumferential wall, and
   wherein the first coupling member has a plurality of arms extending in an axial direction of the first coupling member, each of the arm and the protrusion face each other in a circumferential direction and hold the buffering portion therebetween, and each of the arms is in surface contact with the buffering portion in the circumferential direction.

4. The coupling apparatus according to claim 1, wherein the first coupling member has a boss portion arranged inside of the through hole of the damper member, the boss portion has a spherical body holding portion accommodating the spherical body, and the coupling hole of the first coupling member is open in the spherical body holding portion.

5. The coupling apparatus according to claim 4,
   wherein the boss portion has a third end surface with respect to the axial direction, and
   wherein a dimension of the damper member in the axial direction is set such that a first gap exists between the bottom surface and the third end surface, and a second gap exists between the first end surface and the second end surface, in a state in which the damper member is arranged between the first coupling member and the second coupling member.

6. The coupling apparatus according to claim 1,
   wherein the bottom surface has a plate holding recess accommodating a thrust plate, the spherical body in contact with both of the first end surface and the thrust plate.

7. A motor device comprising:
   the coupling apparatus according to claim 1;
   a motor portion provided with the first rotary shaft; and
   a speed reducing portion assembled in the motor portion,
      wherein the speed reducing portion comprises:
      the second rotary shaft having a worm portion;
      a worm wheel engaging with the worm portion; and
      an output shaft driven by the worm wheel.

8. A wiper motor device for driving a wiper, the wiper motor device comprising:
   the motor device according to claim 7; and
   a converting mechanism converting a rotating motion of the second rotary shaft into a reciprocating motion of the output shaft.

* * * * *